US012585728B2

(12) United States Patent
Lee et al.

(10) Patent No.: US 12,585,728 B2
(45) Date of Patent: Mar. 24, 2026

(54) METHOD AND APPARATUS FOR MACHINE LEARNING BASED INLET DEBRIS MONITORING

(71) Applicant: RAYTHEON TECHNOLOGIES CORPORATION, Farmington, CT (US)

(72) Inventors: Jeremiah C. Lee, Coventry, CT (US); Alek Gavrilovski, Atlanta, GA (US); Parakrama Herath, Avon, CT (US); Daniel McMenamin, Ellington, CT (US)

(73) Assignee: RTX Corporation, Farmington, CT (US)

( * ) Notice: Subject to any disclaimer, the term of this patent is extended or adjusted under 35 U.S.C. 154(b) by 868 days.

(21) Appl. No.: 17/726,675

(22) Filed: Apr. 22, 2022

(65) Prior Publication Data

US 2023/0342424 A1      Oct. 26, 2023

(51) Int. Cl.
*G06F 18/2135* (2023.01)
*G05B 23/02* (2006.01)
(Continued)

(52) U.S. Cl.
CPC ..... *G06F 18/2135* (2023.01); *G05B 23/0254* (2013.01); *G06F 18/2137* (2023.01); *G06N 3/02* (2013.01); *G06F 2218/04* (2023.01)

(58) Field of Classification Search
CPC ............. G06F 18/2135; G06F 18/2137; G06F 2218/04; G05B 23/0254
See application file for complete search history.

(56) References Cited

U.S. PATENT DOCUMENTS

| | | |
|---|---|---|
| 8,459,103 B2 | 6/2013 | Khibnik et al. |
| 9,909,971 B2 | 3/2018 | Knobloch et al. |
| | (Continued) | |

FOREIGN PATENT DOCUMENTS

| | | |
|---|---|---|
| CN | 104517097 | 4/2015 |

OTHER PUBLICATIONS

European Search Report for European Patent Application No. 23164835.3 dated Sep. 21, 2023.
(Continued)

*Primary Examiner* — Grace Park
(74) *Attorney, Agent, or Firm* — Carlson, Gaskey & Olds, P.C.

(57) ABSTRACT

An inlet debris monitoring includes processing circuitry configured to: obtain a data set of electrostatic charge data from an electrostatic sensor; utilize a dimensional reduction technique to obtain a first set of basis vectors that represent the data set in a reduced dimensional space that is reduced with respect to initial dimensions of the data set; utilize the first set of basis vectors or a second set of reference basis vectors which are based on historical electrostatic charge data for one or more reference gas turbine engines, to project the data set onto the reduced dimensional space and obtain a reduced dimensional representation of the data set; utilize machine learning to determine whether the reduced dimensional representation of the data set indicates foreign object debris in the particular gas turbine engine; and based on the determination indicating detection of foreign object debris, provide a foreign object debris notification.

24 Claims, 6 Drawing Sheets

(51) Int. Cl.
G06F 18/2137     (2023.01)
G06N 3/02        (2006.01)

(56)                 References Cited

U.S. PATENT DOCUMENTS

| | | | |
|---|---|---|---|
| 11,149,583 B2 | 10/2021 | Dischinger et al. | |
| 11,243,145 B2 | 2/2022 | Mlcak et al. | |
| 2016/0202168 A1* | 7/2016 | Knobloch | G01N 15/06 |
| | | | 701/3 |
| 2018/0060703 A1* | 3/2018 | Fineis | G06F 18/2433 |
| 2020/0079532 A1* | 3/2020 | Rix | B64D 45/00 |
| 2020/0210854 A1 | 7/2020 | Srinivasan et al. | |
| 2020/0224550 A1* | 7/2020 | Dischinger | F01D 21/10 |
| 2020/0371491 A1* | 11/2020 | Wong | G05B 13/027 |
| 2021/0181070 A1* | 6/2021 | Mlcak | G01N 5/02 |
| 2023/0034885 A1* | 2/2023 | Jupudi | F02C 7/057 |

OTHER PUBLICATIONS

Volponi et al., "Development of an information fusion system for engine diagnostics and health management", AIAA 1st Intelligent Systems Technical Conference Sep. 20-22, 2004, pp. 1-15.

* cited by examiner

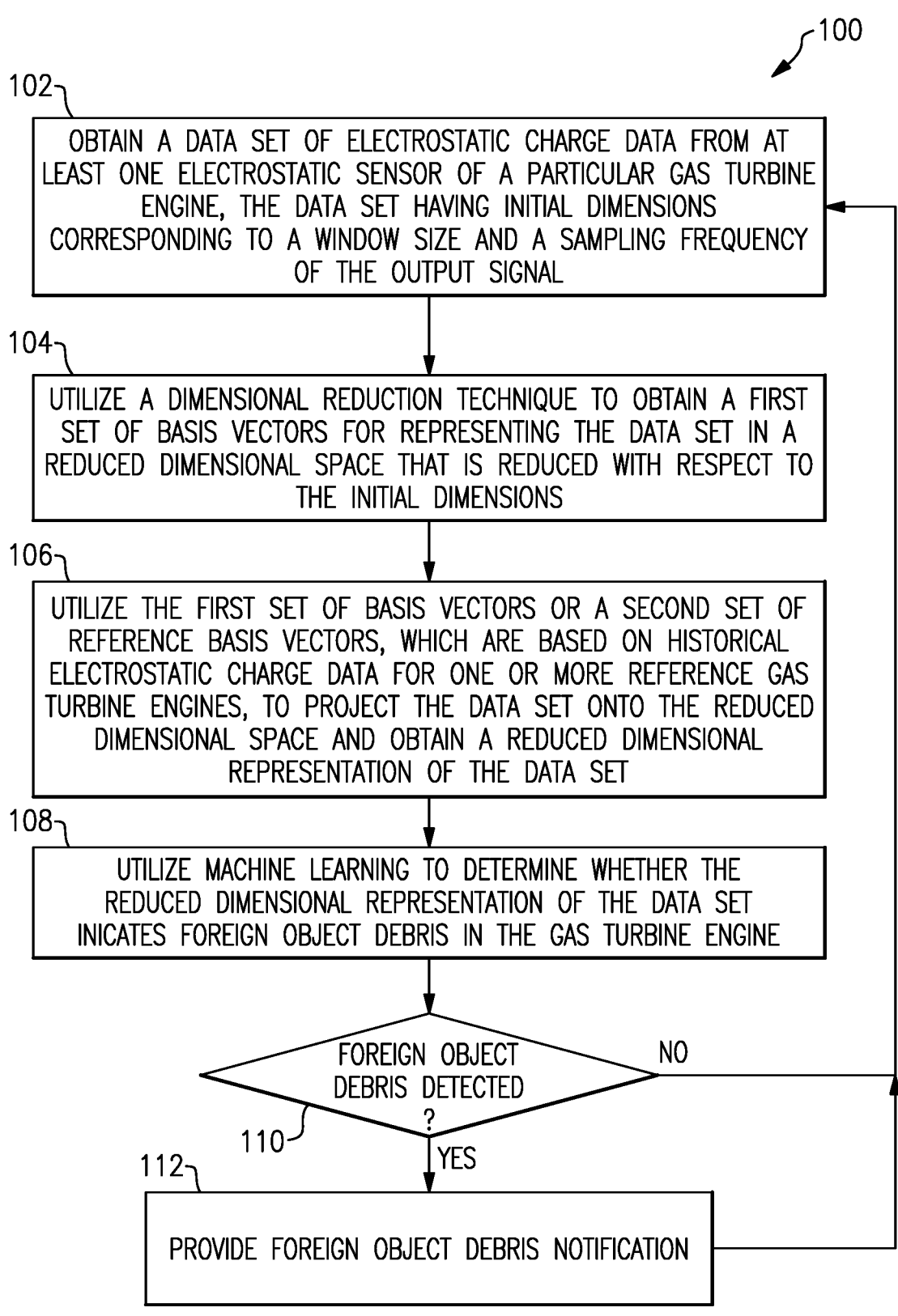

100

102
OBTAIN A DATA SET OF ELECTROSTATIC CHARGE DATA FROM AT LEAST ONE ELECTROSTATIC SENSOR OF A PARTICULAR GAS TURBINE ENGINE, THE DATA SET HAVING INITIAL DIMENSIONS CORRESPONDING TO A WINDOW SIZE AND A SAMPLING FREQUENCY OF THE OUTPUT SIGNAL

104
UTILIZE A DIMENSIONAL REDUCTION TECHNIQUE TO OBTAIN A FIRST SET OF BASIS VECTORS FOR REPRESENTING THE DATA SET IN A REDUCED DIMENSIONAL SPACE THAT IS REDUCED WITH RESPECT TO THE INITIAL DIMENSIONS

106
UTILIZE THE FIRST SET OF BASIS VECTORS OR A SECOND SET OF REFERENCE BASIS VECTORS, WHICH ARE BASED ON HISTORICAL ELECTROSTATIC CHARGE DATA FOR ONE OR MORE REFERENCE GAS TURBINE ENGINES, TO PROJECT THE DATA SET ONTO THE REDUCED DIMENSIONAL SPACE AND OBTAIN A REDUCED DIMENSIONAL REPRESENTATION OF THE DATA SET

108
UTILIZE MACHINE LEARNING TO DETERMINE WHETHER THE REDUCED DIMENSIONAL REPRESENTATION OF THE DATA SET INICATES FOREIGN OBJECT DEBRIS IN THE GAS TURBINE ENGINE

FOREIGN OBJECT DEBRIS DETECTED ?          NO

110

YES

112
PROVIDE FOREIGN OBJECT DEBRIS NOTIFICATION

FIG.3

METHOD AND APPARATUS FOR MACHINE LEARNING BASED INLET DEBRIS MONITORING

BACKGROUND

This application relates to inlet debris monitoring for gas turbine engines, and more particularly to utilizing dimensional reduction and machine learning to perform inlet debris monitoring for gas turbine engines.

Gas turbine engines include multiple sections, such as a fan section, a compression section, a combustor section, a turbine section, and an exhaust nozzle section. During operation, the fan section moves air into the engine. The air is compressed as the air flows through the compression section. The compressed air is then mixed with fuel and combusted in the combustor section. Products of the combustion expand to rotationally drive the fan and compressor.

Some gas turbine engines utilize inlet debris monitoring systems to detect and monitor debris entering the engine (e.g., particles of debris or larger objects such as birds). These systems typically include one or more electrostatic sensors within or in front of the fan section of the engine. The debris sensors detect debris entering the engine by sensing the electrostatic charge carried by the debris.

In a laboratory setting, entry of debris into some gas turbine engines may cause an electrostatic sensor signal to change (e.g., to have a pulse followed by a tail that dips into the opposite direction). During operational conditions, however, there is considerably more noise than in the laboratory, which highly modifies and distorts the detection signal, making detection more complex. Detection is made even more complex because different engines have different noise signatures, which may vary based on the age, environment, and/or geographic territory in which the engine operates. For example, different environments may have different ambient conditions, different pollutants, and different levels of dustiness of the environment where the engine operates and/or when it is stored.

Traditionally, rigid rule-based systems have been used for inlet debris monitoring signal analysis, in which criteria can be derived from a signal (e.g., the peak value and how it compares with the noise level preceding it, the duration of the leading peak and the duration of the tail as well as their relative magnitude, etc.), and then critical values can be assigned to those criteria (e.g., with the assistance of a human expert). Selecting optimal critical values is a complex and computationally intensive process, because the critical values are coupled to the overall system nonlinearly, and may not be independent of each other. The critical values may be dependent on signal conditioning filters used to remove noise, for example, and may also vary depending on the unique noise signature and sensor bias of a particular aircraft. Moreover, when a gas turbine engine ages, there is no guarantee that the same set of critical values apply.

SUMMARY

An inlet debris monitoring system includes at least one electrostatic sensor configured to provide an output signal indicative of an electrostatic charge in a nacelle of a particular gas turbine engine and includes processing circuitry. The processing circuitry is configured to obtain a data set of electrostatic charge data from the output signal, the data set having initial dimensions corresponding to a window size and a sampling frequency of the output signal; utilize a dimensional reduction technique to obtain a first set of basis vectors that represent the data set in a reduced dimensional space that is reduced with respect to the initial dimensions; utilize the first set of basis vectors or a second set of reference basis vectors, which are based on historical electrostatic charge data for one or more reference gas turbine engines, to project the data set onto the reduced dimensional space and obtain a reduced dimensional representation of the data set; utilize machine learning to determine whether the reduced dimensional representation of the data set indicates foreign object debris in the particular gas turbine engine; and based on the determination indicating detection of foreign object debris, provide a foreign object debris notification.

In a further embodiment of the foregoing embodiment, the reduced dimensional space is reduced by 90-99.999% with respect to the initial dimensions.

In a further embodiment of any of the foregoing embodiments, the reduced dimensional space is reduced by 99-99.999% with respect to the initial dimensions.

In a further embodiment of any of the foregoing embodiments, to utilize machine learning, the processing circuitry is configured to utilize the reduced dimensional representation of the data set as training data for a computer model trained with the historical electrostatic charge data and utilize the computer model to determine whether the reduced dimensional representation of the data set indicates the presence of foreign object debris.

In a further embodiment of any of the foregoing embodiments, the second set of reference basis vectors represent a reference dimensional space that is reduced with respect to a dimensionality of the historical electrostatic charge data and to utilize the dimensional reduction technique. The processing circuitry is configured to determine a difference between the reduced dimensional space and the reference dimensional space; based on a difference being in a predefined threshold, utilize the second set of reference basis vectors to project the data set onto the reduced dimensional space; and based the difference being outside the predefined threshold, utilize the first set of basis vectors to update/and replace the second set of reference basis vectors, and use the updated basis vectors to project the data set onto the reduced dimensional space.

In a further embodiment of any of the foregoing embodiments, the difference is a difference between a dimensionality of the reduced dimensional space and a dimensionality of the reference dimensional space.

In a further embodiment of any of the foregoing embodiments, the computer model is a neural network.

In a further embodiment of any of the foregoing embodiments, the one or more reference gas turbine engines include the particular gas turbine engine.

In a further embodiment of any of the foregoing embodiments, the dimensional reduction technique is Principal Component Analysis In a further embodiment of any of the foregoing embodiments, to obtain the data set of electrostatic charge data from the at least one electrostatic sensor, the processing circuitry is configured to receive the output signal from the at least one electrostatic sensor. The processing circuitry is also configured to perform at least one of: filter the signal, amplify the signal, or remove bias in the signal due to a sampling rate of the signal.

A method of inlet debris monitoring for a gas turbine engine includes obtaining a data set of electrostatic charge data from an output signal of at least one electrostatic sensor. The output signal is indicative of an electrostatic charge in a nacelle of a particular gas turbine engine. The data set has initial dimensions corresponding to a window size and a sampling frequency of the output signal. The method also includes utilizing a dimensional reduction technique to obtain a first set of basis vectors that represent the data set in a reduced dimensional space that is reduced with respect to the initial dimensions and utilizing the first set of basis vectors or a second set of reference basis vectors, which are based on historical electrostatic charge data for one or more reference gas turbine engines, to project the data set onto the reduced dimensional space and obtain a reduced dimensional representation of the data set; utilizing machine learning to determine whether the reduced dimensional representation of the data set indicates foreign object debris in the particular gas turbine engine; and based on the determination indicating detection of foreign object debris, providing a foreign object debris notification.

In a further embodiment of the foregoing embodiment, the reduced dimensional space is reduced by 90-99.999% with respect to the initial dimensions.

In a further embodiment of any of the foregoing embodiments, the reduced dimensional space is reduced by 99-99.999% with respect to the initial dimensions.

In a further embodiment of any of the foregoing embodiments, said utilizing machine learning includes utilizing the reduced dimensional representation of the data set as training data for a computer model trained with the historical electrostatic charge data, and utilizing the computer model to determine whether the reduced dimensional representation of the data set indicates the presence of foreign object debris.

In a further embodiment of any of the foregoing embodiments, the second set of reference basis vectors represent a reference dimensional space that is reduced with respect to a dimensionality of the historical electrostatic charge data. Said utilizing the dimensional reduction technique includes determining a difference between the reduced dimensional space and the reference dimensional space; based on a difference being in a predefined threshold, utilizing the second set of reference basis vectors to project the data set onto the reduced dimensional space; and based the difference being outside the predefined threshold, utilizing the first set of basis vectors to update the second set of reference basis vectors, and use the updated basis vectors to project the data set onto the reduced dimensional space.

In a further embodiment of any of the foregoing embodiments, the difference is a difference between a dimensionality of the reduced dimensional space and a dimensionality of the reference dimensional space.

In a further embodiment of any of the foregoing embodiments, the one or more reference gas turbine engines include the particular gas turbine engine.

In a further embodiment of any of the foregoing embodiments, the dimensional reduction technique is Principal Component Analysis.

In a further embodiment of any of the foregoing embodiments, said obtaining the data set of electrostatic charge data from the at least one electrostatic sensor includes receiving a signal from the at least one electrostatic sensor; and performing at least one of filtering the signal, amplifying the signal, or removing bias in the signal due to a sampling rate of the signal.

In a further embodiment of any of the foregoing embodiments, said providing the foreign object debris notification comprises performing one or more of logging a warning flag, providing a visual notification, or providing an audible notification.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

FIG. 3 is a flowchart of an example method of inlet debris monitoring for a gas turbine engine.

DETAILED DESCRIPTION

Figure 1:
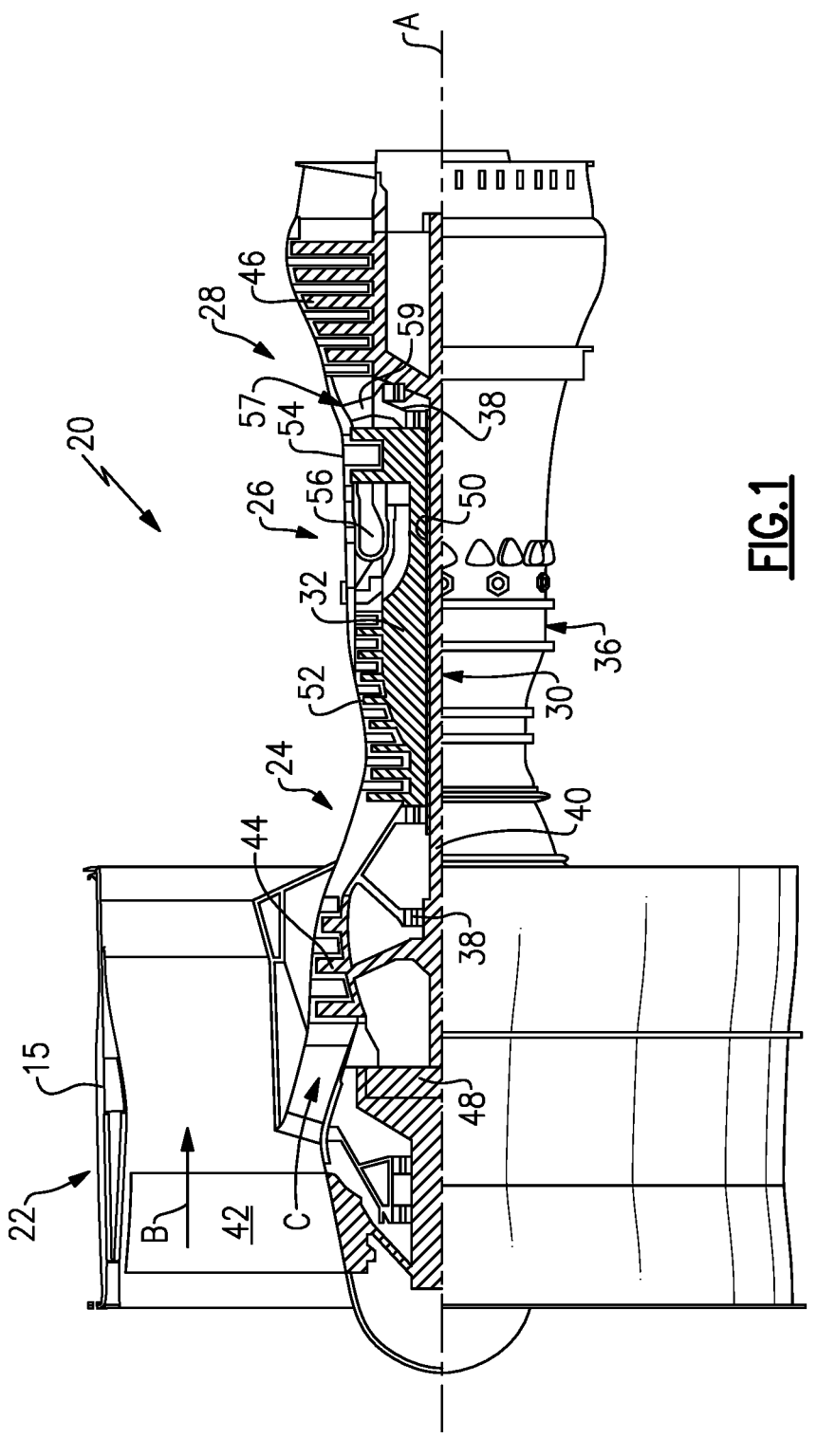
FIG. 1 is a schematic view of an example gas turbine engine that includes an inlet debris monitoring system.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. In the non-limiting example of FIG. 1, the mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of various components, such as the fan section 22, compressor section 24, combustor section 26, and turbine section 28 may be varied. Although a geared turbofan engine is depicted in FIG. 1, it is understood that this is a non-limiting example, and that the techniques discussed herein could be applied to debris monitoring systems for other types of engines (e.g., turbofan engines that are non-geared, helicopter engines, etc.).

Figure 2:
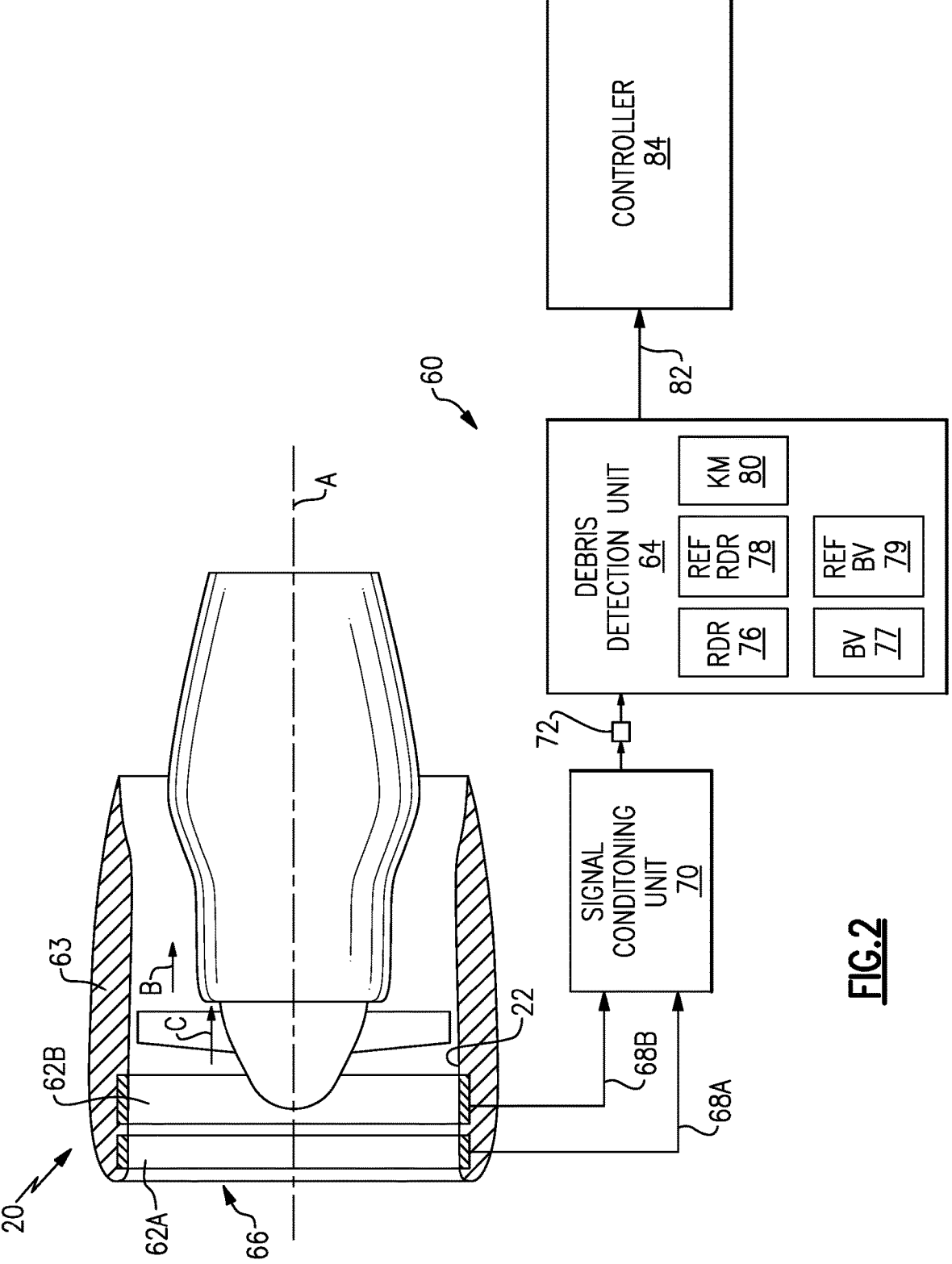
FIG. 2 is a schematic view of an example inlet debris monitoring system for the gas turbine engine of FIG. 1.

FIG. 2 schematically illustrates an inlet debris monitoring system 60 for the gas turbine engine 20 of FIG. 1. In the non-limiting example of FIG. 2, the debris monitoring system 60 includes a first electrostatic sensor 62A and a second electrostatic sensor 62B that is downstream of the first electrostatic sensor 62A. However, it is understood that different quantities of sensors may be used in other examples (e.g., one or more than two). The electrostatic sensors 62A-B are spaced apart from each other along the engine central longitudinal axis A, and are configured to measure electrostatic charge in a nacelle 63 of the gas turbine engine 20. The electrostatic sensors 62A-B, which may be annular or may have another geometry, are mounted to a nacelle 63 of the gas turbine engine 20. The nacelle 63 includes an inlet 66, and the electrostatic sensors 62A-B are configured to measure an electrostatic charge of debris that enters the nacelle 63 of the gas turbine engine 20 through the inlet 66.

A signal conditioning unit ("SCU") 70 is configured to receive sensor signals 68A-B from the electrostatic sensors 62A-B), and based on the signals 68A-B, provide a data set 72 that is a time trace of conditioned signal data to a debris detection unit 64. The SCU 70 performs one or more of the following: signal filtering, signal amplification, removal of bias due to sampling rate, etc. The SCU 70 may include a low pass, high pass, or bandpass filter, for example.

As will be discussed in more detail below, the debris detection unit 64 is configured to utilize a dimensional reduction technique, such as Principal Component Analysis (PCA), and/or other machine learning techniques to obtain and utilize first set of basis vectors 77 (e.g., PCA vectors) to obtain a reduced dimensional representation 76 of the data set. The debris detection unit 64 also accesses a reference reduced order representation 78 of historical electrostatic sensor data which has an associated second set of reference basis vectors 79. The debris detection unit 64 creates and/or updates a computer model 80 using the reduced dimensional representation 76 of the data set 72. The computer model 80 may be a neural network, a reduced PCA reproduction, an autoencoder, or another type of model, for example.

The debris detection unit 64 compares the model output of the reduced dimensional representation 76 to that evaluated with the reference reduced dimensional representation 78, (e.g., from models based on the previously performed PCA, which may include field data and/or laboratory-recorded data, for example) and based on that comparison, it determines whether foreign object debris has entered the inlet 66 of the gas turbine engine 20. If foreign object debris is detected, the debris detection unit 64 provides a foreign object debris notification which may include, output signal 82 to a controller 84, such as a Full Authority Digital Engine Control ("FADEC"). The output signal 82 may include an instruction to provide a notification, such as a visual notification (e.g., on an electronic display or a warning) and/or an audible notification, and/or may include logging an electronic warning flag (typically called the HRC for Health Report Code) that is stored in the controller 84 along with the time that this detection occurred).

As discussed above, the computer model 80 may be a neural network. However, the neural network model using the reduced order representation is optional and it can be replaced by other types of models that may be more computationally efficient, such as an unsupervised model based on a reduced order PCA reproduction.

FIG. 3 is a flowchart of an example method 100 of inlet debris monitoring for a gas turbine engine, such as the gas turbine engine 20. The method 100 is at least partially performed by the debris detection unit 64 in one example.

A data set 72 of electrostatic charge data is obtained from the at least one electrostatic sensor 62 of a particular gas turbine engine (step 102). The raw data set 72 likely has a naturally occurring high number of dimensions being a segment of a time trace of a high frequency sampling signal (e.g., potentially on the order of 12,500-250,000 dimensions). As discussed above, the at least one electrostatic sensor 62 is configured to provide an output signal indicative of an electrostatic charge in a nacelle 63 of a particular gas turbine engine, such as the gas turbine engine 20.

In one example, the data set 72 obtained in step 102 has been conditioned by the SCU (as depicted in FIG. 2). In the same or another example, the data set 72 is trimmed and/or clipped to identify rolling windows which are approximately peak-centered, to identify regions of interest.

A dimensional reduction technique is utilized (step 104) to obtain a first set of basis vectors that represent the data set in a reduced dimensional space that is reduced with respect to the initial dimensions of the data set 72. The error of the dimensionality reduction is carefully controlled. Due to performance of the dimensional reduction technique, this reduction in dimensionality of the dataset is significant, usually by 2 to 3 orders of magnitude. In one example, the reduction in dimensionality is 90-99.999%. In a further example, the reduction in dimensionality is 95-99.999%. In a further example, the reduction in dimensionality is 99-99.999%. In a further example, the reduction in dimensionality is 99-99.99%. Some non-limiting examples of dimensional reduction techniques that may be used include PCA, Singular Value Decomposition (SVD), Kernel PCA, Dynamic Model Decomposition, Linear Discriminate Analysis, and Low Dimension Invariant Manifold Technique.

The first set of basis vectors 77, or the second set of reference basis vectors 79 (which are based on historical electrostatic charge data for one or more gas turbine engines) are utilized to project the data set 72 onto the reduced dimensional space and obtain the reduced dimensional representation 76 of the data set 72 (step 106).

A machine learning technique is utilized (step 108) to determine whether the reduced dimensional representation 76 of the data set 72 indicates foreign object debris in the gas turbine engine.

If foreign object debris is detected (a "yes" to step 110), a foreign object debris notification is provided (step 112) to serve as a notification of the detected debris, and the method proceeds back to 102 to repeat for another data set. The foreign object debris notification may be provided to the controller 84 in FIG. 2, and may include an audible indication, visual indication (e.g., on an electronic display), and/or a logging of a warning flag, for example.

If foreign object debris is not detected (a "no" to step 110), the method proceeds back to step 102 without a foreign object debris notification.

Figure 4:
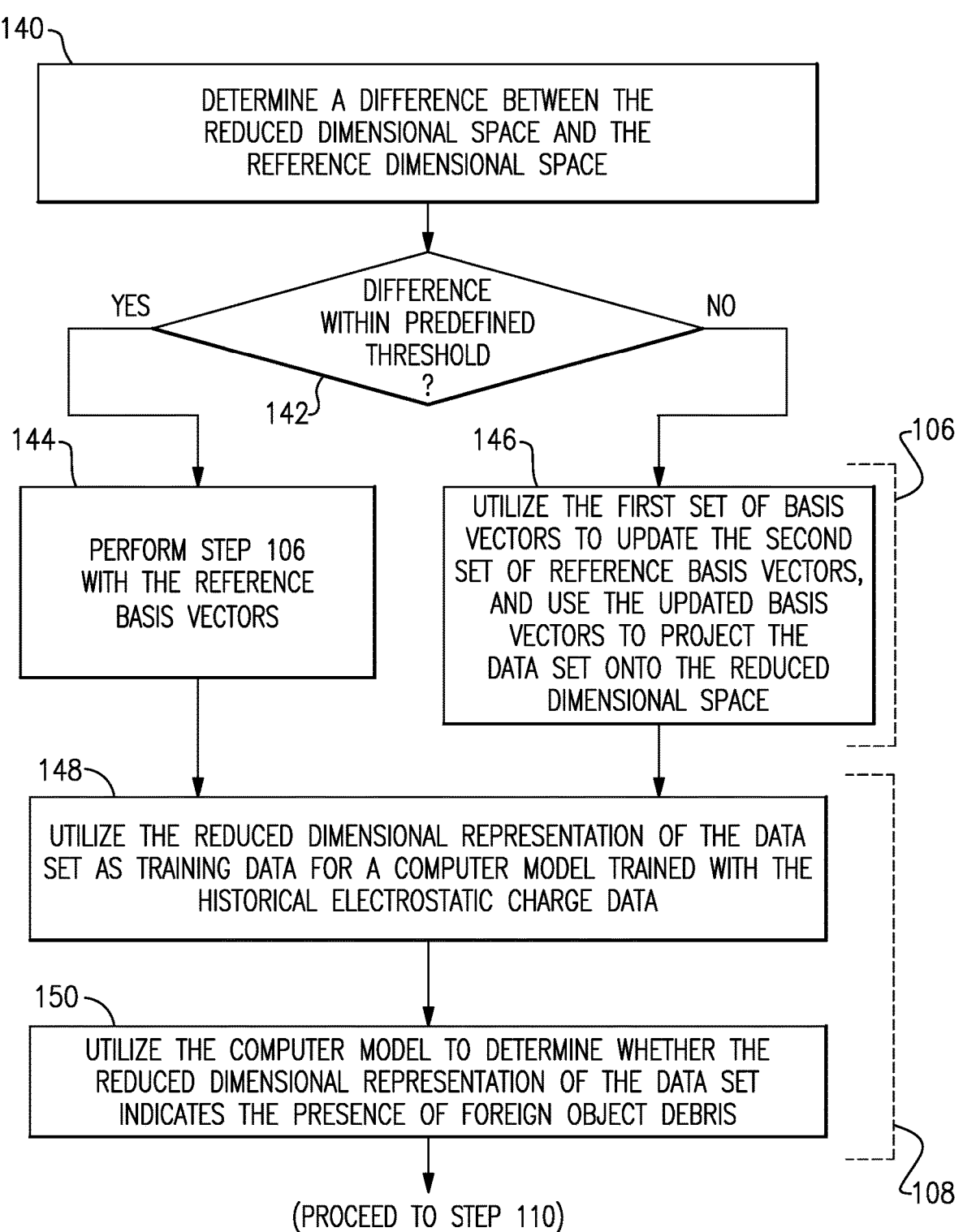
FIG. 4 is a flowchart that depicts an example implementation of some steps of the method of FIG. 3.

FIG. 4 is a flowchart that depicts an example implementation of steps 106 and 108 of the method 100 in which a neural network may be used. In FIG. 4, steps 144 and 146 correspond to step 106 of FIG. 3, and steps 148 and 150 correspond to step 108 of FIG. 3.

A second set of reference vectors (referenced above in relation to step 106) are obtained, which are based on historical electrostatic charge data for one or more reference gas turbine engines (e.g., the gas turbine engine 20). The second set of reference basis vectors 79 discussed above in connection with step 106 represent a reference dimensional space that is reduced with respect to a dimensionality of the historical electrostatic charge data. A difference is determined between the reduced dimensional space and the reference dimensional space (step 140), and that difference is compared to a threshold (step 142).

If the difference is in the threshold (a "yes" to step 142), then step 106 is performed with the second set of reference basis vectors 79 (shown as 144 in FIG. 4). Conversely, if the difference is outside the threshold (a "no" to step 142), the first set of basis vectors 77 are used to update the reference basis vectors 79, and the updated basis vectors are used to project the data set 72 onto the reduced dimensional space discussed in step 106 (shown as 146 in FIG. 4). The update could include replacing one or more of the reference basis vectors 79, for example. As used in FIG. 4, "first" and "second" do not connote first and second in time, as the "first set of basis vectors 77" is newer than the "second set of reference basis vectors 79." Instead, "first" and "second" just indicate that the sets are different sets.

As used herein, the "difference" may refer to a difference in dimensionality (e.g., quantity of dimensions) and/or a difference between an identity of the reference and reduced dimensional spaces. In one example, the dimensionality of the reference and reduced dimensional spaces is the same, but the identity of the spaces differs.

The threshold may be a percentage (e.g., 5% or 10%), for example. As a particular dimensionality example, assume that the threshold is 5% and the dimensionality of the reference dimensional space is 40. Five percent of 40 is 2. Thus, the difference being in the threshold for step 142 would be ±1, and the difference being outside the threshold for step 142 would be ±3 or more. Similarly, a metric could be used to determine the difference (e.g., a distance) between the identity of the reference and reduced dimensional spaces.

Applying the 5% example to FIG. 4, if the difference/error determined in step 140 is within 5%, then step 106 is performed with the reference basis vectors (step 144) and the reference basis vectors are not updated. One may also reverse this and determine the difference in step 140 by comparing the new basis vectors to the reference vector and see if the error is within 5%.

The difference being greater than the predefined threshold (a "no" to step 142) indicates that the particular gas turbine engine is likely experiencing some conditions that differ from those of the reference basis vectors 77 derived from one or more previous data sets. This could include different weather conditions, pollutant concentrations, or could just be aging of components in the gas turbine engine 20. Regardless of what those differing conditions are, it indicates that the debris detection unit 64 may benefit from an update to the reference reduced dimensional representation 78 so that the reference basis vectors 79 more accurately reflects current conditions of the gas turbine engine 20.

The reduced order representation 76 of the data set 72 is utilized (step 148) as training data for the computer model 80 (which as discussed above is trained with historical electrostatic charge data, and may be a neural network). The pretrained or the newly trained (with the most recent in-the-field dataset) computer model 80 is utilized to determine whether the reduced order representation of the data set indicates the presence of debris (step 150).

There are two general ways to do this: using a supervised system or an unsupervised system. The first system (supervised) may be constructed by randomly adding to some of the field signal time traces, the lab created sensor signals to produce a labelled training set for a neural network classifier (neural network not necessarily used). The second (unsupervised) method involves an unlabeled data set (without any added known signal) and uses an unsupervised method such as a neural network autoencoder or a reduced order PCA reproduction. Any of such methods will determine a signal being normal or that it represents an ingestion of debris. The method then proceeds to step 110 in FIG. 3.

Although neural networks have been described in the context of FIG. 4, it is understood that other machine learning techniques could be used, such as random forest, decision tree, support vector machine, k-mean, etc.

Figure 5:
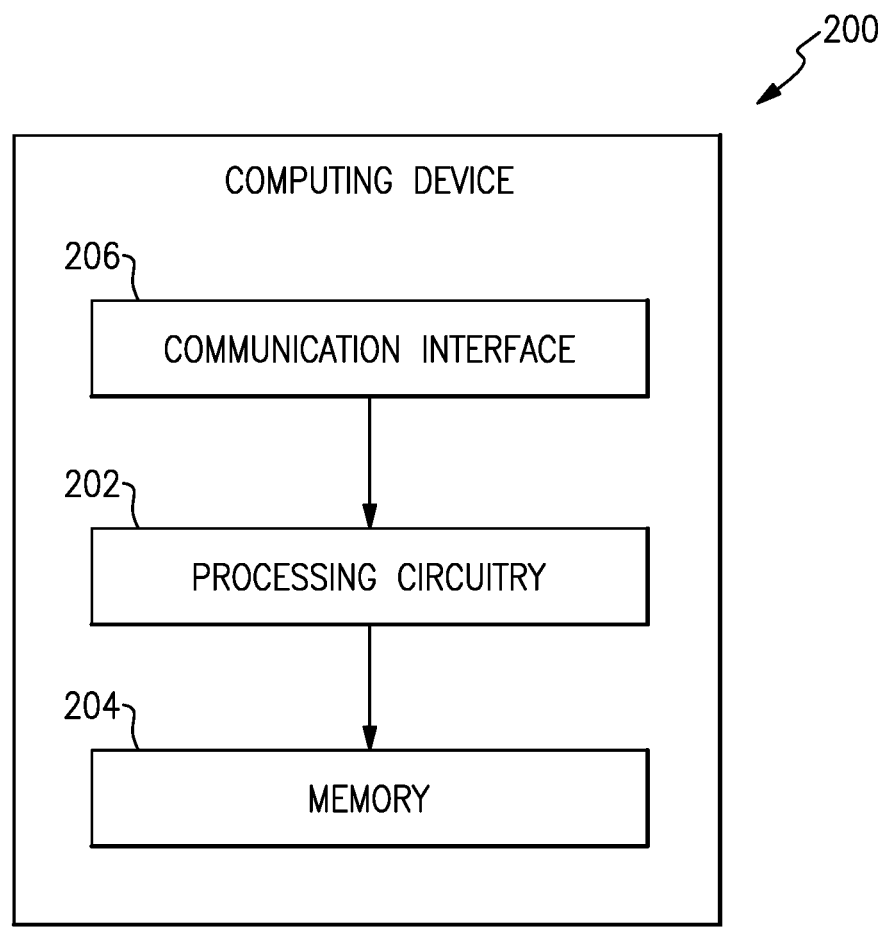
FIG. 5 schematically illustrates an example computing device that may be used in the system of FIG. 2.

FIG. 5 schematically illustrates an example computing device 200 that may be used to implement the functionality of the debris detection unit 64 and optionally also the signal conditioning unit 70, for example. The computing device 200 includes processing circuitry 202 operatively connected to memory 204 and a communication interface 206. The processing circuitry 202 may include one or more microprocessors, microcontrollers, application specific integrated circuits (ASICs), or the like, for example.

The memory 204 may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 204 may incorporate electronic, magnetic, optical, and/or other types of storage media. The memory 204 may also have a distributed architecture, where various components are situated remotely from one another, but can be accessed by the processing circuitry 202.

The communication interface 206 is configured to facilitate communication between computing device 200 and other computing devices (e.g., the signal conditioning unit 70 and the controller 84).

The processing circuitry 202 of the computing device 200 may include the signal conditioning unit (SCU) 70, or the SCU 70 may be separate from the computing device 200.

Figure 6:
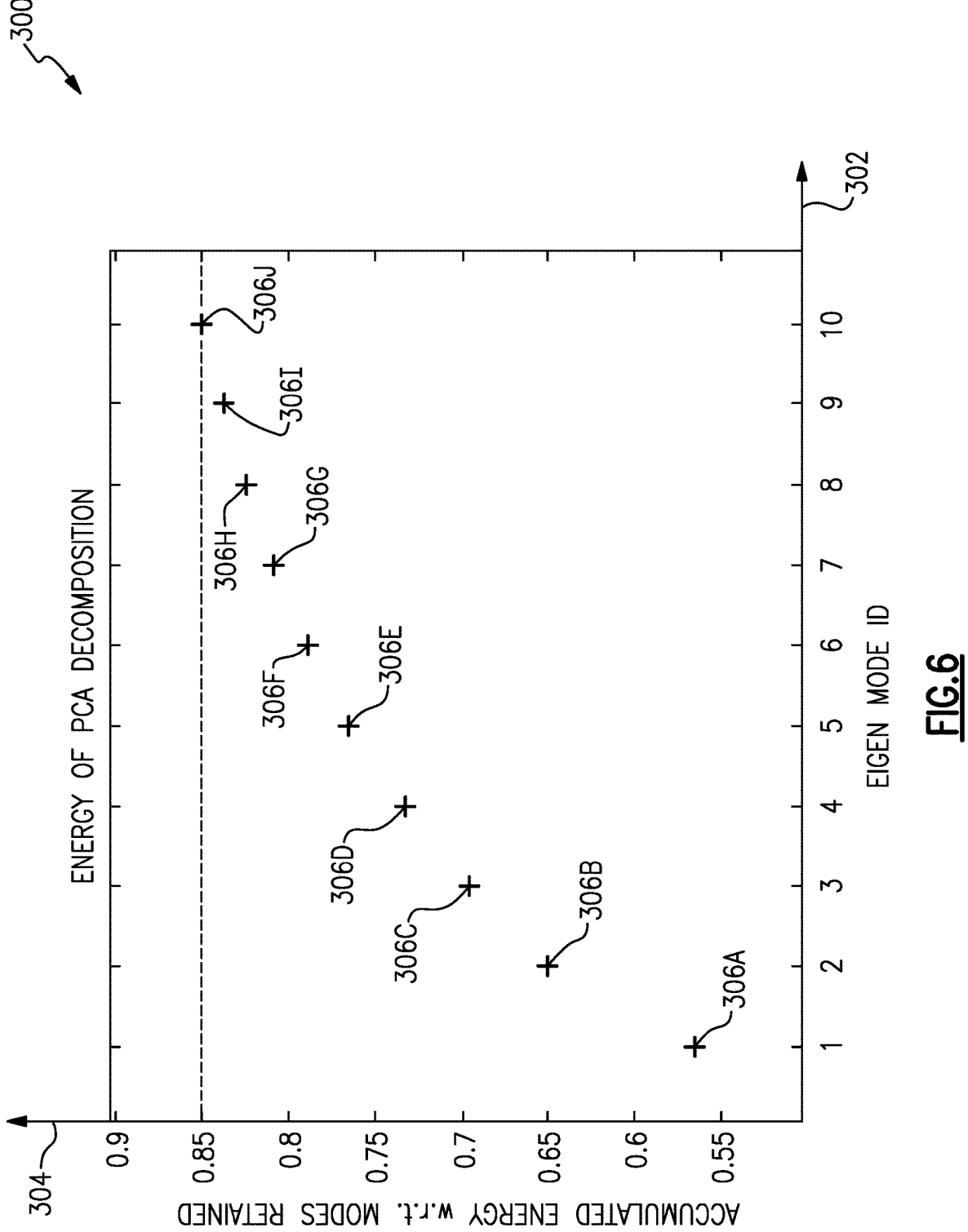
FIG. 6 illustrates a graph depicting leading order modes of an example inlet debris monitoring data set.

FIG. 6 illustrates a graph 300 depicting the leading order modes of an example reduced order representation 76 of an inlet debris monitoring data set 72, where the vectors determined in the reduced order representation 76 are information content (y-axis) vs number of retained dimension (x-axis) that came out of an PCA analysis. Although particular values are shown for the discussion of FIG. 6, it is understood that these are example values, and that other values for other data sets 72 could be used. The x-axis 302 indicates an ID of a plurality of leading order PCA modes, of which there are 10. The y-axis 304 indicates an accumulated energy or information content with respect to the modes retained. As shown, the ten leading order modes 306A-J allow for retaining 85% of the actual time trace data. In this example, 85% is a desired threshold of data to be retained, but other thresholds could be used. Above the threshold, remaining non-leading order modes could be discarded, as they likely represent noise components or very rarely occurring signals. The "modes" shown in the x-axis 302 in some examples are strong discriminants and can be used to tell apart signals of debris from harmless noise effectively even with distance-based clustering of the data set 72, as represented in the reduced dimensional space.

As discussed in the background, without the techniques taught herein, foreign object detection has relied on rigid rule-based systems that use a number of criteria for signal analysis and critical values assigned to those criteria. The assignment of critical values to those criteria has traditionally relied on expert input or optimizing with a set of inputs from time traces of normal signals (i.e., signals representing no debris) with random addition of lab created debris signals. However, the performance of such expert-based system may not be robust as different engines may exhibit distinct sensor bias and noise characteristics. Also, when an engine ages, there is no guarantee that the same set of critical values apply. Repeating an optimization for an engine in situ may not be feasible due to the high computational cost of optimization. The techniques discussed herein provide a computationally efficient technique for detecting foreign object which can readily accommodate engine aging or operations in unique environments without requiring complex expert-based optimization or re-optimization.

In one particular example, it was found that application of method 100 with 40 PCA modes (or features), enabled the recovery over 90% of the information (the actual time trace), with the remaining modes being noise components, and then construct a PCA reconstruction based model in a process that took only minutes, whereas a non-machine learning optimization of the same system took several days. It was found that application of the method 100 had a probability of detection at 98% while maintaining a false alarm rejection probability also at 98%.

Foreign object detection in a gas turbine engine is generally a relatively rare event, so much of the signals from the electrostatic sensors 54 are expected to be noise. The method 100 is useful for detecting such rare outlier foreign object debris detection events.

Although historic electrostatic sensor data from different engines may be used (e.g., in the reference reduced order representation 78), the method 100 can still be effective if used to perform machine learning based on a single gas turbine engine, which can help account for the unique aspects of a particular engine (e.g., its age, the geographic environment and conditions in which it was primarily operated, etc.).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An inlet debris monitoring system, comprising:
at least one electrostatic sensor configured to provide an output signal indicative of an electrostatic charge in a nacelle of a particular gas turbine engine of an aircraft; and
processing circuitry configured to:
obtain a data set of electrostatic charge data from the output signal, the data set having initial dimensions corresponding to a window size and a sampling frequency of the output signal;
utilize a dimensional reduction technique to obtain a first set of basis vectors that represent the data set in a reduced dimensional space that is reduced with respect to the initial dimensions;
utilize the first set of basis vectors or a second set of reference basis vectors, which are based on historical electrostatic charge data for one or more reference gas turbine engines, to project the data set onto the reduced dimensional space and obtain a reduced dimensional representation of the data set;
utilize machine learning to determine whether the reduced dimensional representation of the data set indicates foreign object debris in the particular gas turbine engine; and
based on the determination indicating detection of foreign object debris, provide a foreign object debris notification for the gas turbine engine of the aircraft;
compare model output of the reduced dimensional representation to that evaluated with the reference reduced dimensional representation; and
perform the determination of whether foreign object debris has entered the inler of the gas turbine engine based on the comparison.

2. The inlet debris monitoring system of claim 1, wherein the reduced dimensional space is reduced by 90-99.999% with respect to the initial dimensions.

3. The inlet debris monitoring system of claim 1, wherein the reduced dimensional space is reduced by 99-99.999% with respect to the initial dimensions.

4. The inlet debris monitoring system of claim 1, wherein to utilize machine learning, the processing circuitry is configured to:
utilize the reduced dimensional representation of the data set as training data for a computer model trained with the historical electrostatic charge data; and
utilize the computer model to determine whether the reduced dimensional representation of the data set indicates the presence of foreign object debris.

5. The inlet debris monitoring system of claim 4, wherein:
the second set of reference basis vectors represent a reference dimensional space that is based on the historical electrostatic charge data; and
to utilize the dimensional reduction technique, the processing circuitry is configured to utilize the second set of reference basis vectors to project the data set onto the reduced dimensional space.

6. The inlet debris monitoring system of claim 1, wherein the one or more reference gas turbine engines include the particular gas turbine engine.

7. The inlet debris monitoring system of claim 1, wherein the dimensional reduction technique is Principal Component Analysis.

8. The inlet debris monitoring system of claim 1, wherein to obtain the data set of electrostatic charge data from the at least one electrostatic sensor, the processing circuitry is configured to:
receive the output signal from the at least one electrostatic sensor; and
perform at least one of:
filter the signal;
amplify the signal; or
remove bias in the signal due to a sampling rate of the signal.

9. The inlet debris monitoring system of claim 1, wherein the machine learning comprises non-neural network machine learning.

10. The inlet debris monitoring system of claim 9, wherein the non-neural network machine learning comprises distance-based clustering or random forest.

11. The inlet debris monitoring system of claim 9, wherein the non-neural network machine learning comprises support vector machine.

12. A method of inlet debris monitoring for a gas turbine engine of an aircraft, comprising:

obtaining a data set of electrostatic charge data from an output signal of at least one electrostatic sensor of a gas turbine engine of an aircraft, the output signal indicative of an electrostatic charge in a nacelle of a particular gas turbine engine, the data set having initial dimensions corresponding to a window size and a sampling frequency of the output signal;

utilizing a dimensional reduction technique to obtain a first set of basis vectors that represent the data set in a reduced dimensional space that is reduced with respect to the initial dimensions;

utilizing the first set of basis vectors or a second set of reference basis vectors, which are based on historical electrostatic charge data for one or more reference gas turbine engines, to project the data set onto the reduced dimensional space and obtain a reduced dimensional representation of the data set;

utilizing machine learning to determine whether the reduced dimensional representation of the data set indicates foreign object debris in the particular gas turbine engine; and based on the determination indicating detection of foreign object debris, providing a foreign object debris notification for the gas turbine engine of the aircraft;

comparing model output of the reduced dimensional representation to that evaluated with the reference reduced dimensional representation; and performing the determination of whether foreign object debris has entered the inlet of the gas turbine engine based on the comparing step.

13. The method of claim 12, wherein the reduced dimensional space is reduced by 90-99.999% with respect to the initial dimensions.

14. The method of claim 12, wherein the reduced dimensional space is reduced by 99-99.999% with respect to the initial dimensions.

15. The method of claim 12, wherein said utilizing machine learning comprises:

utilizing the reduced dimensional representation of the data set as training data for a computer model trained with the historical electrostatic charge data; and utilizing the computer model to determine whether the reduced dimensional representation of the data set indicates the presence of foreign object debris.

16. The method of claim 15, wherein:

the second set of reference basis vectors represent a reference dimensional space that is based on the historical electrostatic charge data; and said utilizing the dimensional reduction technique comprises utilizing the second set of reference basis vectors to project the data set onto the reduced dimensional space.

17. The method of claim 15, wherein:

the second set of reference basis vectors represent a reference dimensional space that is reduced with respect to a dimensionality of the historical electrostatic charge data; and said utilizing the dimensional reduction technique comprises utilizing the first set of basis vectors to update the second set of reference basis vectors, and use the updated basis vectors to project the data set onto the reduced dimensional space.

18. The method of claim 12, wherein the one or more reference gas turbine engines include the particular gas turbine engine.

19. The method of claim 12, wherein the dimensional reduction technique is Principal Component Analysis.

20. The method of claim 12, wherein said obtaining the data set of electrostatic charge data from the at least one electrostatic sensor comprises:

receiving a signal from the at least one electrostatic sensor; and performing at least one of:

filtering the signal;

amplifying the signal; or removing bias in the signal due to a sampling rate of the signal.

21. The method of claim 12, wherein said providing the foreign object debris notification comprises performing one or more of: logging a warning flag, providing a visual notification, or providing an audible notification.

22. A method of inlet debris monitoring for a gas turbine engine of an aircraft, comprising:

obtaining a data set of electrostatic charge data from an output signal of at least one electrostatic sensor of a gas turbine engine of an aircraft, the output signal indicative of an electrostatic charge in a nacelle of a particular gas turbine engine, the data set having initial dimensions corresponding to a window size and a sampling frequency of the output signal;

utilizing a dimensional reduction technique to obtain a first set of basis vectors that represent the data set in a reduced dimensional space that is reduced with respect to the initial dimensions;

utilizing the first set of basis vectors or a second set of reference basis vectors, which are based on historical electrostatic charge data for one or more reference gas turbine engines, to project the data set onto the reduced dimensional space and obtain a reduced dimensional representation of the data set;

utilizing machine learning to determine whether the reduced dimensional representation of the data set indicates foreign object debris in the particular gas turbine engine; and based on the determination indicating detection of foreign object debris, providing a foreign object debris notification for the gas turbine engine of the aircraft;

wherein the machine learning comprises non-neural network machine learning.

23. The method of claim 22, wherein the non-neural network machine learning comprises distance-based clustering.

24. The method of claim 22, wherein the non-neural network machine learning comprises support vector machine or random forest.

* * * * *